United States Patent [19]
Hartman

[11] Patent Number: 5,588,635
[45] Date of Patent: Dec. 31, 1996

[54] LIQUID FLOW VELOCITY DIFFUSER

[76] Inventor: Thomas A. Hartman, 700 Capac Ct., St. Louis, Mo. 63125

[21] Appl. No.: 296,949

[22] Filed: Aug. 26, 1994

[51] Int. Cl.⁶ .............................. F16K 47/14; F15D 1/06
[52] U.S. Cl. .............................................. 251/127; 138/44
[58] Field of Search .................................. 251/118, 127, 251/305; 138/42, 44

[56] References Cited

U.S. PATENT DOCUMENTS

| | | | |
|---|---|---|---|
| 1,144,306 | 6/1915 | Mock | 251/127 X |
| 3,109,459 | 11/1963 | Lee II, et al. | 138/44 X |
| 3,749,130 | 7/1973 | Howitt et al. | 138/42 |
| 3,856,049 | 12/1974 | Scull | 251/127 X |
| 4,150,696 | 4/1979 | Meier et al. | 138/44 |
| 4,295,632 | 10/1981 | Engelke | 251/127 |
| 4,415,369 | 11/1983 | Allmendinger et al. | 251/127 X |
| 4,418,722 | 12/1983 | Kendall et al. | 251/127 X |
| 4,691,894 | 9/1987 | Pyöstsiä et al. | 251/127 |
| 4,960,260 | 10/1990 | McEnearney | 251/127 |

OTHER PUBLICATIONS

Keith E. Lindsey, Ph.D., *Design Parameters For Multijet Sleeve Valves With Conical Velocity Diffusers*, Lindsey Fabricators, Inc. Valve Division, Azusa, California, USA, Jan. 1994, pp. 1–7.

*Primary Examiner*—John Rivell
*Attorney, Agent, or Firm*—Howell & Haferkamp, L.C.

[57] ABSTRACT

A velcoity diffuser having a conical configueration is secured in the interior of a conduit conducting a flow of liquid to increase the velocity and decrease the pressure of an annular layer of the liquid flow adjacent the interior surface of the conduit while decreasing the velocity and increasing the pressure of a remaining portion of the liquid flow within the annular layer. The velocity diffuser employed in a conduit upstream from a butterfly valve diffuses high velocity flow of the liquid around the periphery of the valve and reduces vibration of the butterfly valve in its open position and cavitation downstream from the valve and thereby reduces the noise heard outside the valve housing.

19 Claims, 3 Drawing Sheets

LIQUID FLOW VELOCITY DIFFUSER

BACKGROUND OF THE INVENTION

The present invention pertains to a velocity diffuser that is employed in a conduit conducting a flow of liquid to increase the velocity and decrease the pressure of an annular layer of the liquid flow adjacent the interior surface of the conduit while decreasing the velocity and increasing the pressure of a remaining portion of the liquid flow within the annular layer.

In lengths of conduit containing a butterfly valve for controlling a flow of liquid therethrough, frequently a flow of liquid of significant velocity will impinge upon the disc of the valve when in its open position, causing the disc to shake. Additionally, a liquid flow of significant velocity bypassing an open butterfly valve can become turbulent, creating cavitation in the liquid flow downstream of the valve. The cavitation can have the undesirable effect of accelerating the wear on the interior surface of the conduit downstream of the valve. Additionally, the shaking of the butterfly valve disc in combination with the cavitation produced downstream of the valve can produce a significant amount of damage to the operating mechanism and external noise.

It is an object of the present invention to provide a liquid flow velocity diffuser that produces a velocity gradient symmetric to the center axis of the conduit with faster flowing liquid in an annular layer adjacent the conduit interior surface and surrounding slower flowing liquid within the annular layer. By producing such a velocity gradient in the flowing liquid, the apparatus of the invention reduces the speed of the liquid impinging on the disc of the open butterfly valve and thereby reduces the shaking and vibration of the valve mountings in the conduit and also reduces the turbulence and resulting cavitation downstream of the valve. As a result, the noise outside the conduit due to the liquid flow past the open butterfly valve is significantly reduced.

SUMMARY OF THE INVENTION

The velocity diffuser of the present invention is basically configured as a truncated cone. The diffuser includes a single panel or wall that is formed in a tapered, tubular configuration with an upstream end or peripheral edge defining a base of the truncated cone configuration and a downstream end or interior edge of the tubular wall defining the truncated apex of the cone. The upstream peripheral edge is secured to the interior surface of a conduit either by being welded directly to the conduit or, alternatively, being provided with a sleeve extension and an annular rim that may be fastened between a pair of annular flanges at ends of two attached lengths of conduit. A circular plate or end wall is attached to the downstream end or interior edge of the tapered, tubular wall.

A plurality of openings extend through the conical wall. The openings are spatially arranged around the wall adjacent to the downstream, interior end and spaced from the upstream, peripheral end. Each of the openings is formed as a converging or tapered nozzle with a center axis of each opening extending at approximately a 45° angle relative to the center axes of the conical wall and conduit.

In use, a flow of liquid through a conduit containing the diffuser apparatus of the invention is collected into the interior of the conical wall as it passes the upstream, peripheral edge of the apparatus. The flow of liquid is then passed through the plurality of openings in the wall. As the liquid passes through the plurality of openings, it is accelerated and directed toward the periphery of the conduit interior. This creates an annular layer of liquid flow adjacent the inner peripheral surface of the conduit downstream from the diffuser apparatus. This layer of flow surrounds the remaining portion of the liquid flow at the center of the conduit moving at a lesser velocity downstream from the diffuser apparatus. The annular layer of liquid flow downstream from the diffuser apparatus has a lesser pressure than the remaining portion of the liquid flow surrounded by the annular layer. The slower moving portion of the liquid flow at the center of the conduit exerts a pressure force on the faster moving annular layer of liquid flow that surrounds it and maintains pressure and velocity gradients symmetric to the center axis of the conduit created by the velocity diffuser as the liquid flow approaches the butterfly valve.

With the butterfly valve in its open position, the halves of the disc on the opposite sides of the valve transverse shaft are positioned substantially parallel to the center axis of the conduit. Therefore, the disc halves of the valve are subjected to the slower moving portion of the liquid flow at the center of the conduit while the faster moving annular layer of liquid flow adjacent the interior surface of the conduit passes around the valve disc surfaces. Only the opposite ends of the butterfly valve transverse shaft are subjected to the faster moving annular layer of liquid flow. As a result, shaking and vibration of the butterfly valve due to its being moved to an open position in a high velocity flow of liquid through the conduit is substantially reduced. Additionally, turbulence and cavitation created by a high velocity flow passing over the butterfly valve in its open position are also significantly reduced. As a result, the noise heard outside the conduit due to shaking and vibration of the butterfly valve and due to turbulence and cavitation created downstream of the valve is significantly reduced.

BRIEF DESCRIPTION OF THE DRAWING FIGURES

Further objects and features of the present invention are revealed in the following detailed description of the preferred embodiment of the invention and in the following drawing figures wherein.

DESCRIPTION OF THE PREFERRED EMBODIMENT

Figure 1:
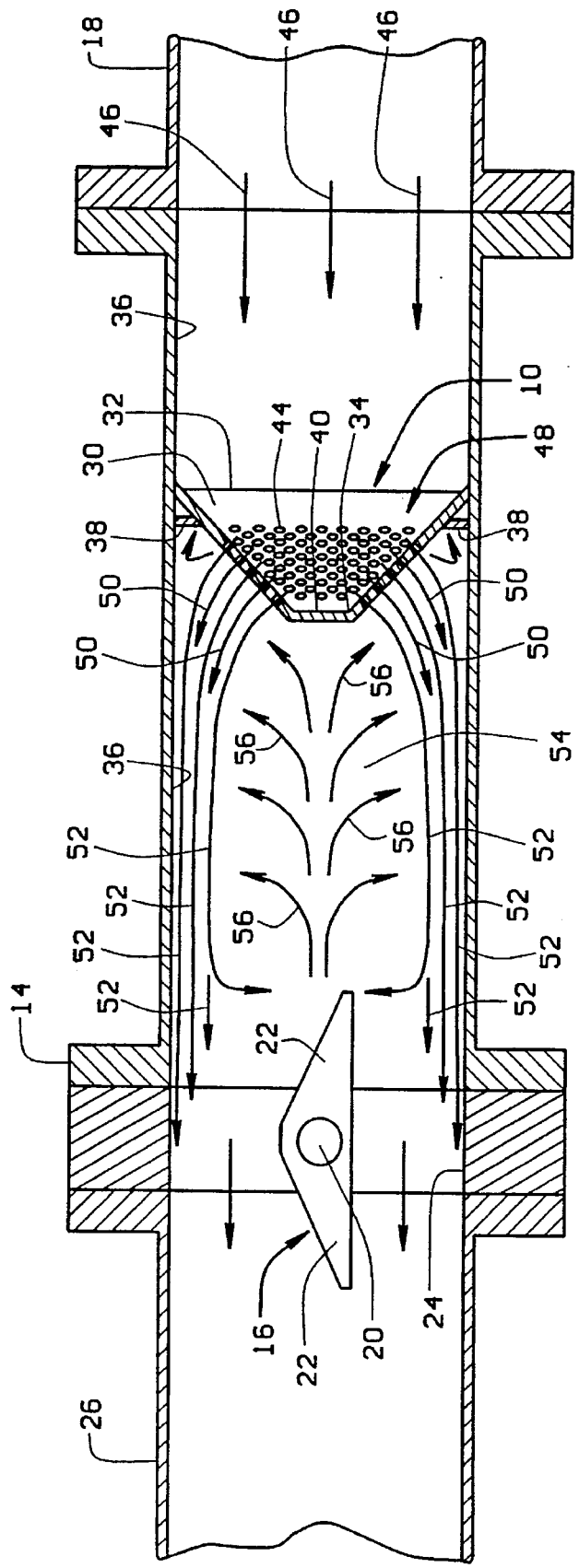
FIG. 1 is a cross sectional elevation view of the liquid flow velocity diffuser apparatus of the present invention in one operative environment of the apparatus.

The velocity diffuser apparatus 10 of the present invention is shown in FIG. 1 in one operative environment of the apparatus. FIG. 1 shows a schematic representation of the diffuser apparatus 10 employed in a length of liquid conducting conduit 12. The conduit 12 is connected to the valve housing 14 of a butterfly isolation valve 16 at its left end as viewed in FIG. 1 and is connected to an adjacent length of upstream conduit 18 shown on the right in FIG. 1. The butterfly isolation valve 16 is a conventional valve and includes a transverse shaft 20 on which the valve disc halves 22 are mounted. As is conventional, the disc halves 22 have semi-circular configurations that project radially from opposite sides of the transverse shaft 20. Together, the periphery of the disc halves 22 close off the interior 24 of the valve housing 14, obstructing liquid flow through the housing. In FIG. 1, the butterfly valve 16 is shown in its opened position with the disc halves 22 positioned substantially parallel to the center axes of the conduits. An additional length of conduit 26 is shown connected to the downstream end of the valve housing 14.

In the operative environment shown in FIG. 1, a high velocity liquid flow passes through the lengths of conduit from the upstream conduit 18, through conduit 12 to the downstream conduit 26. As the high velocity liquid flow bypasses the butterfly valve turned to its open position shown in FIG. 1, the force of the liquid impinging on the disc halves 22 of the valve will often cause the valve to flutter or vibrate in the high velocity flow. The vibrations can be so severe as to cause failure at the transverse shaft 20 in the valve housing. Additionally, the vibration of the valve in the valve housing 14 can produce significant noise outside the valve housing.

In addition to the noise created due to vibration of the butterfly valve, the high velocity flow passing over and under the valve disc halves 22 can become turbulent in the downstream conduit 26 creating cavitation in the liquid flow downstream from the butterfly valve 16. The cavitation produced in the liquid flow through the downstream conduit 26 can have the undesirable effect of accelerating the wear on the interior surface of the conduit. Additionally, the cavitation produced downstream of the valve can produce a significant amount of noise heard outside the downstream conduit.

The velocity diffuser apparatus 10 of the present invention is employed in an environment such as that shown in FIG. 1 to produce a velocity gradient in the flow of liquid symmetric to the center axis of the conduits with faster flowing liquid in an annular layer adjacent the conduit interior surfaces and surrounding a slower flowing liquid within the annular layer. By producing such a velocity gradient in the flowing liquid, the apparatus of the invention reduces the speed of the liquid impinging on the disc halves 22 of the butterfly valve 16 and thereby reduces the shaking and vibration of the valve mountings in the housing. The apparatus of the invention also reduces the turbulence and resulting cavitation downstream from the valve 16. As a result, the noise outside the conduit due to the liquid flow past the open butterfly valve is significantly reduced and the wear to the conduit interior due to cavitation is also reduced.

Figure 3:
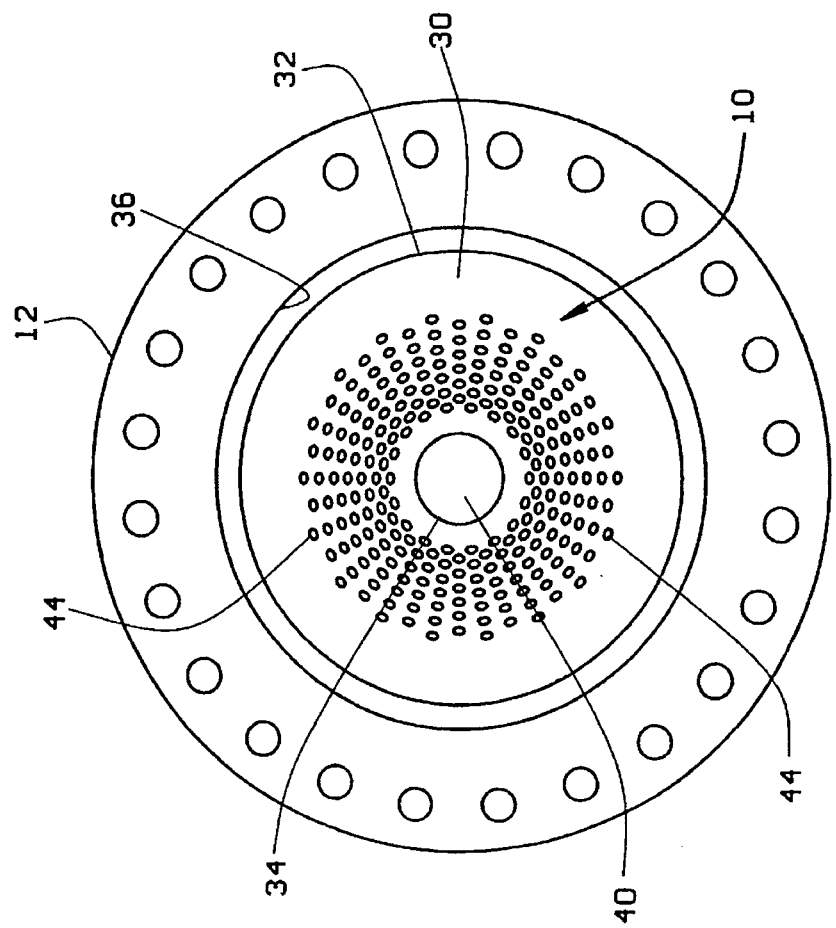
FIG. 3 is an end view of the apparatus shown in FIG. 2.
Figure 2:
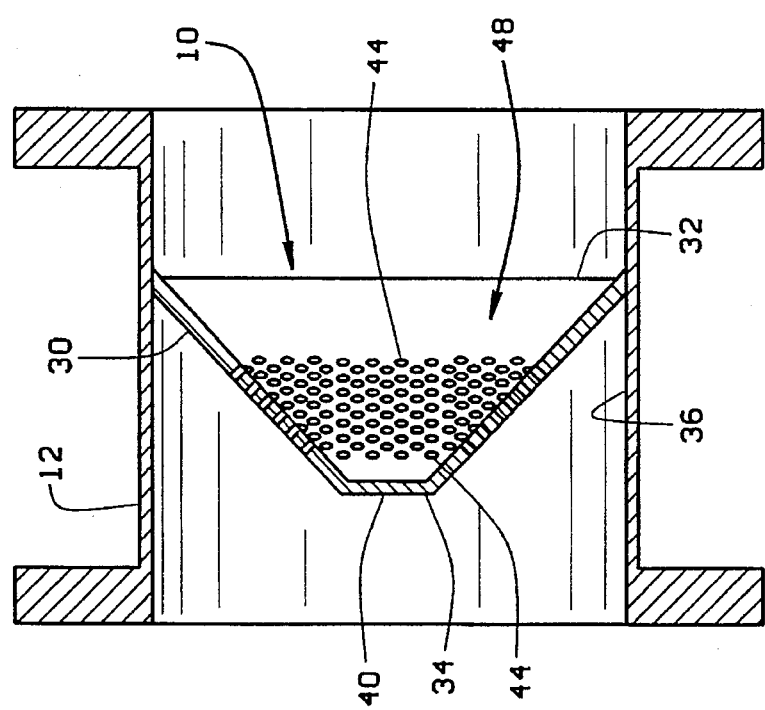
FIG. 2 is a cross section of a first embodiment of the liquid flow velocity diffuser apparatus.

The velocity diffuser apparatus 10 of the present invention shown in FIGS. 1–3 is basically configured as a truncated cone. However, variant embodiments of the apparatus may have a pyramidal shape with a rectangular cross section instead of the circular cross section of the cone configuration shown. The diffuser 10 is comprised of a single panel or wall 30 that is formed in the-tapered, tubular configuration of the truncated cone. The tubular wall has a peripheral edge or upstream end 32 which defines the base of the truncated cone configuration. The tubular wall also has an interior edge or downstream end 34 which defines the truncated apex of the tubular configuration.

The upstream peripheral edge 32 of the tubular wall is secured to the interior surface 36 of the conduit 12 by being welded directly to the conduit interior surface. The welds extend completely around the peripheral edge 32 of the tubular wall. In the preferred embodiment, the wall 30 is oriented at approximately a 45° angle relative to the center axis of the conduits and relative to the interior surface of the conduits. To provide reinforcement to the diffuser and strengthen its attachment to the conduit interior 36, an annular ring 38 may be welded between the diffuser 10 and the conduit interior 36 in the position shown in FIG. 1. A circular plate 40 is secured to the interior, downstream end 34 of the tubular wall completely closing over the apex of the wall's conical configuration.

A plurality of openings 44 extend through the tubular wall 30. As seen in FIGS. 1–3, the openings 44 are spatially arranged around the wall and are positioned closer to the interior, downstream end of the wall than the peripheral, upstream end. Each of the openings 44 is formed as a converging, tapered nozzle as it extends from the upstream, or right hand, side of the diffuser shown in FIGS. 1 and 2 to the downstream, or left hand, side of the diffuser. In the preferred embodiment of the invention, the center axes of each of the openings 44 extends at approximately a 45° angle relative to the center axes of the tubular wall 30 and the conduit 12. With the configuration of the velocity diffuser 10 described and shown in the drawings, it can be seen that the flow of liquid approaching the diffuser first enters the conical configuration of the diffuser by passing its peripheral edge 32, then passes through the plurality of openings 44 in the diffuser wall 30, and continues to flow downstream from the diffuser.

Referring again to FIG. 1, the velocity diffuser 10 of the present invention is shown secured to the interior surface 36 of a length of conduit 12 leading to a butterfly valve 16 downstream from the diffuser. In use of the diffuser apparatus 10, it may be desirable to coat the interior surface 36 of the conduit immediately downstream of the diffuser with a polymeric epoxy to prevent wear to this surface due to the redirected liquid flow created by the diffuser. With the diffuser 20 secured in its position in the conduit interior 36 shown in FIG. 1, the high velocity flow of liquid in a downstream direction approaching the diffuser 10 is represented by the arrows 46. The flow of liquid through the conduit bypasses the peripheral edge 32 of the diffuser and is collected in the interior 48 of the tubular wall 30. The flow of liquid then passes from the cone interior 48 through the plurality of openings 44 in the wall. As the liquid passes through the plurality of openings 44, it is accelerated due to the tapering, nozzle configurations of the openings and is directed toward the periphery of the conduit interior as is represented by the arrows 50. The passage and acceleration of the liquid passing through the openings 44 creates an annular layer of liquid flow adjacent the inner peripheral surface 36 of the conduit downstream from the diffuser apparatus 10. This annular layer of flow represented by the arrows 52 moves downstream through the conduit at a greater velocity than a portion of the liquid flow 54 surrounded by the annular layer 52. This portion of the liquid flow 54 at the center of the conduit 12 moves downstream at a lesser velocity than the annular layer of flow 52 created by the diffuser. However, the slower moving portion of the liquid flow 54 has a higher pressure, represented by arrows 56, than the faster moving annular layer 52. This increased pressure of the slower moving portion of flow 54 assists in maintaining the fast moving annular layer of flow 52 adjacent the peripheral interior surface of the conduit 12 as it approaches the butterfly valve 16 downstream. In this manner, the slower moving portion of the liquid flow at the center of the conduit just downstream of the diffuser 10 maintains pressure and velocity gradients symmetric to the center axis of the conduit 12 created by the velocity diffuser 10 as the liquid flow approaches the butterfly valve 16.

With the butterfly valve 16 moved to its open position shown in FIG. 1, the valve disc halves 22 on opposite sides of the valve transverse shaft 20 are positioned substantially parallel to the center axis of the conduit 12. In this position, the disc halves of the valve are subjected to the slower moving portion of liquid flow 54 at the center of the conduit while the faster moving annular layer of flow 52 surrounding the inner periphery of the conduit passes over and under the disc halves 22. Only the opposite ends of the transverse shaft 20 adjacent their sealed, journal mountings in the valve housing 14 are subjected to the faster moving annular layer of liquid flow 52. As a result, shaking and vibration of the butterfly valve 16 subjected to a high velocity flow in its open position is substantially reduced. The turbulence and cavitation created by a high velocity flow passing over the butterfly valve in its open position are also significantly reduced due to the high pressure, slow moving portion of flow 54 at the center of the conduit maintaining the low pressure, high velocity annular layer of flow 52 adjacent the periphery of the conduit 12 as it bypasses the valve 16. In this manner, the velocity diffuser 10 of the present invention significantly reduces the noise heard outside the conduit 12 and valve housing 14 due to shaking and vibration of the butterfly valve and due to turbulence and cavitation created downstream of the valve.

Figure 5:
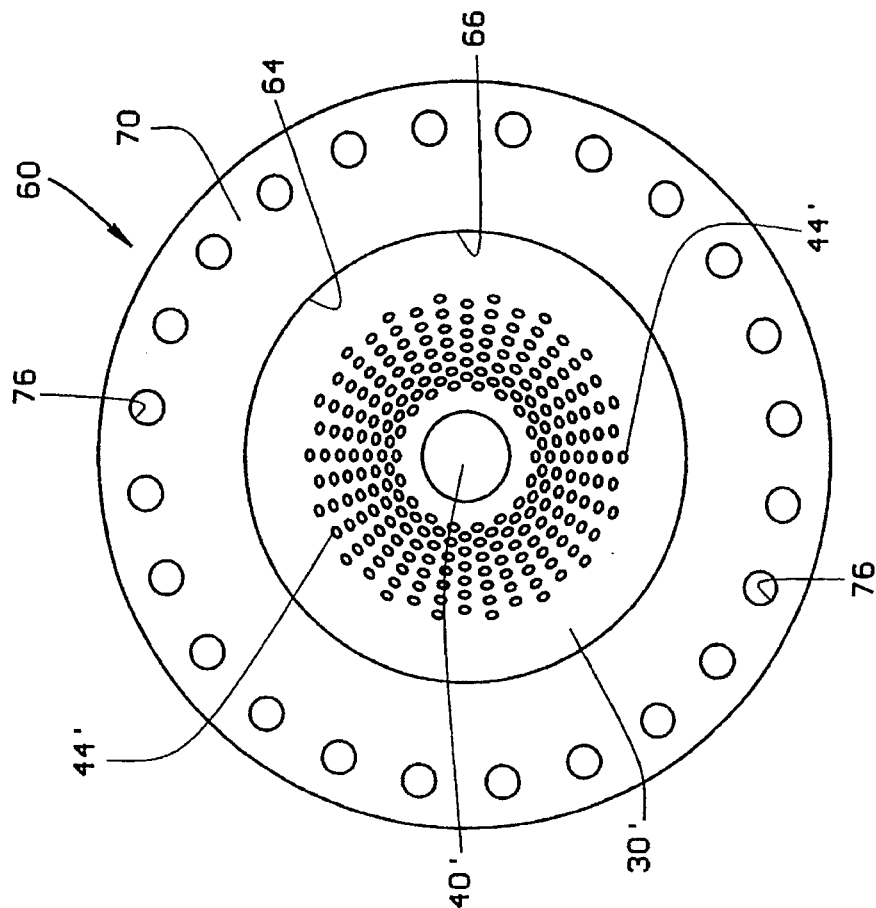
FIG. 5 is an end view of the apparatus shown in FIG. 4.
Figure 4:
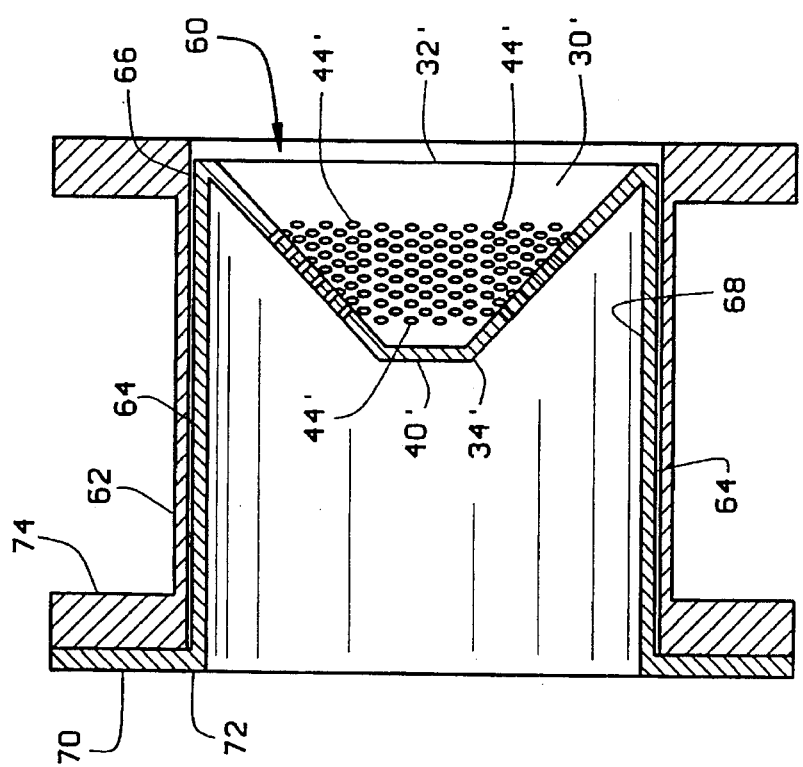
FIG. 4 is a cross section view of a further embodiment of the liquid flow velocity diffuser apparatus.

A second embodiment of the velocity diffuser apparatus of the present invention is shown in FIGS. 4 and 5. This second embodiment of the velocity diffuser 60 has the same conical configuration as the first described embodiment and like reference numerals followed by a prime (') are employed in FIGS. 4 and 5 to label the component parts of the diffuser 60 that are the same as those of the first described embodiment of the diffuser 10. The second embodiment of the diffuser 60 differs from the first described embodiment in the manner in which it is secured in the interior of a length of conduit 62. As shown in FIGS. 4 and 5, the peripheral, upstream end 32' of the diffuser 60 is secured to a tubular, cylindrical sleeve 64 at an upstream end 66 of the sleeve. In the preferred embodiment, the sleeve 64 is constructed of stainless steel. The stainless steel sleeve is both corrosion resistent and erosion resistant and functions in the same manner as the polymeric epoxy coating employed on the interior surface of the conduit 12 of the first described embodiment of the invention. Alternatively, a metal sleeve 64 may be employed with the interior surface 68 of the sleeve coated with a polymeric epoxy to provide the interior surface with corrosion and erosion resistance. As seen in FIG. 4, the exterior dimension of the sleeve 64 is determined so that it may be inserted into the interior of the conduit 62 with a tight fit between the conduit interior and the sleeve exterior. An annular rim 70 is secured to the sleeve downstream end 72. The annular rim 70 has a peripheral configuration dimensioned to match the peripheral configuration of an end flange 74 of the conduit 62. The annular rim 70 is provided with a plurality of openings 76 that align with bolt openings (not shown) of the conduit flange 74. The annular rim 70 is positioned adjacent the conduit flange 74 with the sleeve 64 inserted into the conduit interior as shown in FIG. 4, and then the next length of conduit downstream from the diffuser 60 is bolted to the conduit flange 74 with the diffuser annular rim 70 secured between the two bolted flanges of the adjacent conduits. In this manner, the embodiment of the diffuser 60 shown in FIGS. 4 and 5 is secured in the interior of the conduit 62 without the welds employed in the first embodiment. This alternative embodiment functions in the same manner as the previously described embodiment to create an annular layer of high velocity liquid flow through the conduit surrounding a lesser velocity flow of liquid.

While the present invention has been described by reference to a specific embodiment, it should be understood that modifications and variations of the invention may be constructed without departing from the scope of the invention defined in the following claims.

What is claimed is:

1. An apparatus for diffusing velocity of liquid flowing in a conduit, the apparatus comprising:

at least one wall positioned inside the conduit for directing the liquid flowing through the conduit radially outwardly toward an inner peripheral surface of the conduit creating an annular layer of liquid flow adjacent to the inner peripheral surface of the conduit;

said at least one wall having a peripheral end and an opposite interior end, the peripheral end of the wall being secured to the conduit with the wall positioned inside the conduit projecting toward a center axis of the conduit as the wall extends from its peripheral end toward its interior end.

2. The apparatus of claim 1 wherein:

said at least one wall also increases the velocity of at least a portion of the liquid.

3. The apparatus of claim 1 wherein:

said at least one wall increases the velocity of the annular layer of liquid flowing adjacent to the interior surface of the conduit so that the annular layer is flowing at a greater velocity than liquid surrounded by the annular layer.

4. The apparatus of claim 1 wherein:

said at least one will decreases the pressure of the annular layer of liquid flowing adjacent to the interior surface of the conduit so that the annular layer has a lesser pressure than liquid surrounded by the annular layer.

5. The apparatus of claim 1, wherein:

said at least one wall for directing the liquid flowing through the conduit further includes a plurality of openings through the wall, each of the openings being oriented in the wall to direct a flow of liquid through the openings away from a center axis of the conduit and toward the conduit inner peripheral surface.

6. The apparatus of claim 1, wherein:

the wall is secured in the conduit with the wall extending in a downstream direction of liquid flow and tapering away from the inner peripheral surface of the conduit and toward the conduit center axis as it extends from its peripheral end toward its interior end.

7. The apparatus of claim 1 wherein:

said at least one wall has a tubular configuration, the peripheral end of the wall being secured around the inner peripheral surface of the conduit with the wall projecting through the conduit from its peripheral end toward its interior end.

8. The apparatus of claim 7, wherein:

the wall has a conical configuration and tapers away from the inner peripheral surface of the conduit as it extends from its peripheral end to its interior end.

9. The apparatus of claim 7, wherein:

said at least one wall further includes a plurality of openings through the wall, each of the openings being oriented in the wall to direct a flow of liquid through the openings away from a center axis of the conduit and toward the conduit inner peripheral surface.

10. The apparatus of claim 9, wherein:

the wall has a configuration of a truncated cone and tapers away from the inner peripheral surface of the conduit as it extends from its peripheral end to its interior end, and a circular plate is attached to the interior end of the wall.

11. The apparatus of claim 9, wherein:

the plurality of openings are spatially arranged around the center axis of the conduit.

12. The apparatus of claim 11, wherein:

the plurality of openings are arranged on the wall adjacent the interior end of the wall and spaced from the peripheral end of the wall.

13. The apparatus of claim 1, wherein:

said at least one wall is secured inside the conduit by an annular rim on the apparatus having a configuration complementary to a configuration of an annular flange of the conduit enabling the rim to be secured to the flange.

14. In a length of conduit having a valve therein for selectively opening and closing a path of liquid flow through the conduit, an apparatus upstream of the valve for diffusing a flow velocity of liquid flowing through the conduit, the apparatus comprising:

at least one wall having an upstream end and a downstream end, means for securing the upstream end of the wall to the conduit with the wall positioned extending downstream in the conduit and tapering away from an interior surface of the conduit as it extends from the wall upstream end to the wall downstream end, and the wall having a plurality of openings therethrough, each of the openings being oriented in the wall to direct a flow of liquid through the openings away from a center axis of the conduit.

15. The apparatus of claim 14, wherein:

the plurality of openings are configured to accelerate the flow of liquid through the openings and create a layer of liquid flow adjacent the conduit interior surface that is flowing at a greater velocity than liquid adjacent the center axis of the conduit.

16. The apparatus of claim 14, wherein:

the valve is a butterfly valve having a transverse shaft mounted for rotation in the center of the conduit and a pair of semicircular disc halves extending from opposite sides of the transverse shaft, and the plurality of openings direct the flow of liquid through the openings over opposite sides of the disc halves when the valve is in an open position in the conduit.

17. The apparatus of claim 14, wherein:

the wall has a tubular configuration with the upstream end of the wall extending around one end of the tubular configuration and the downstream end of the wall extending around an opposite end of the tubular configuration, the means for securing the apparatus inside the conduit secures the upstream end of the wall around the inner peripheral surface of the conduit with the wall tapering downstream through the conduit to its downstream end.

18. The apparatus of claim 17, wherein:

the wall configuration is also conical.

19. The apparatus of claim 17, wherein:

the plurality of openings are spatially arranged around the center axis of the conduit adjacent the downstream end of the wall and spaced from the upstream end of the wall.

* * * * *